Oct. 15, 1929.  E. E. McGREW  1,731,634
AUTOMOBILE AWNING
Filed Sept. 17, 1926
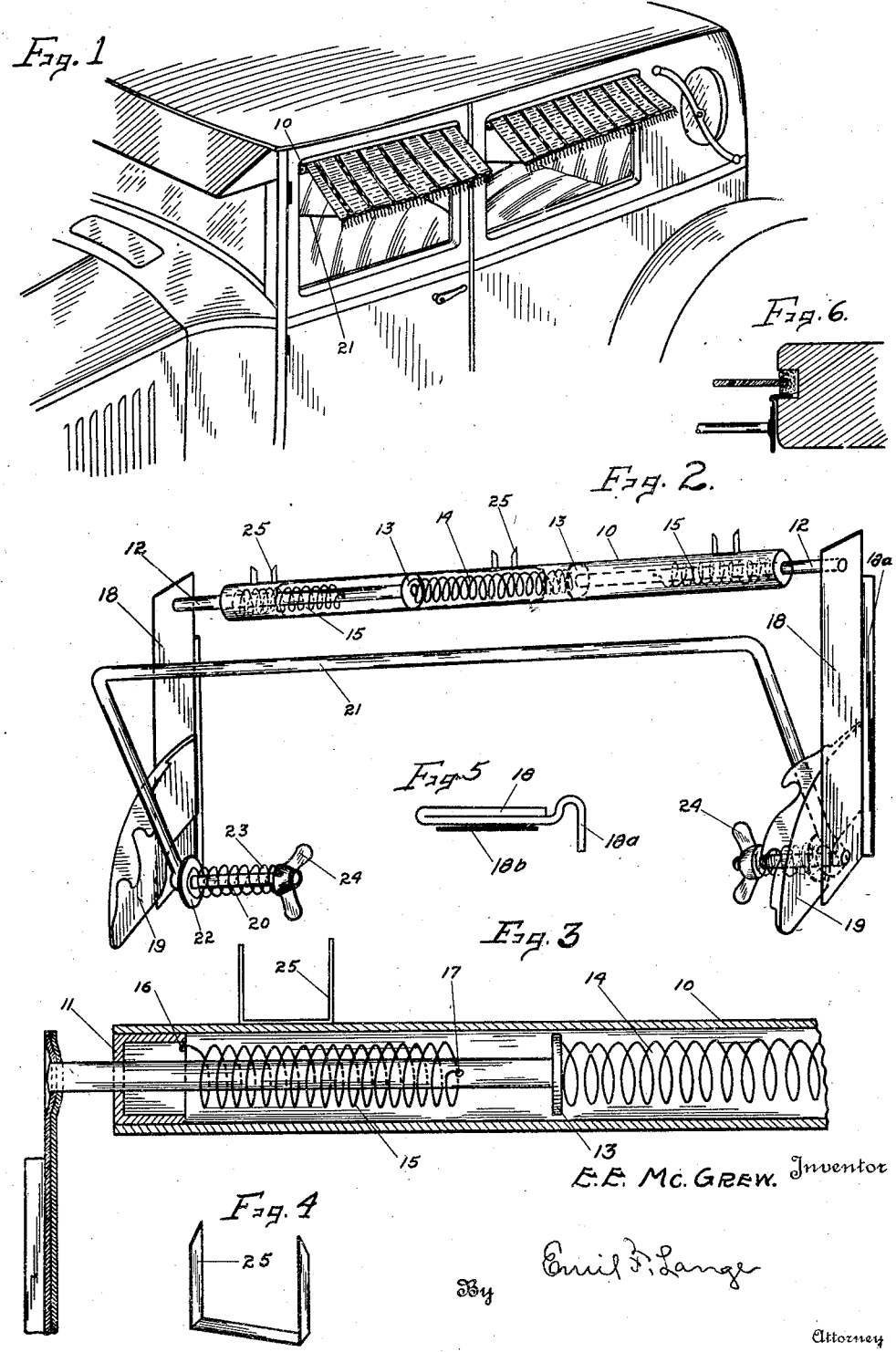

Patented Oct. 15, 1929

1,731,634

UNITED STATES PATENT OFFICE

EARL E. McGREW, OF LINCOLN, NEBRASKA, ASSIGNOR TO McGREW MACHINE COMPANY, OF LINCOLN, NEBRASKA, A CORPORATION OF NEBRASKA

AUTOMOBILE AWNING

Application filed September 17, 1926. Serial No. 136,182.

My invention relates to awnings and shade rollers of the kinds which are especially adapted for use in the window openings of coupes and sedans and other closed automobiles. It is my object to provide a shade roller and clamping arrangement of such construction that it may be quickly and easily seated in or removed from the window frame or casing and so that the awning may be firmly held against flapping in any of its operative positions. Especially is it my object to provide a frame for the awning roller with means for firmly seating the frame in such position that the window may be opened and closed without interference from the awning or its frame, and without the necessity of removing the awning and its frame to afford clearance for the window. It is also my object to provide an arrangement of the kind specified which is firm in construction, durable in use, neat and attractive in appearance, and of the utmost simplicity of operation.

Having in view these objects and others which will be mentioned in the following description, I will now refer to the drawings, in which Figure 1 is a view in perspective of a portion of an automobile with my invention applied thereto.

Figure 2 is a perspective view of the shade roller and the frame, all parts of the device being shown except the awning.

Figure 3 is a sectional view of a portion of the awning roller showing both the roller spring and the spring which spreads the arms of the attachment.

Figure 4 is a view in perspective of the clip for fastening the shade to the roller.

Figure 5 is an end edge view of one of the clamping arms, the figure showing also the edge of the rubber padding.

Figure 6 is a sectional view of the side of the automobile and the window casing of the automobile and showing particularly the relation of the clamping arm to the window and its casing.

The roller shown at 10 is tubular with cup shaped caps 11 driven into the ends of the roller. The caps 11 are provided with central apertures for receiving the axes having disks 13 secured thereto, preferably by welding. The space within the roller 10 between the disks 13 has a coil spring 14 bearing against both disks to keep the disks 13 spread under the compression of the spring. Surrounding each axle 12 within the roller 10 is a coil spring 15 which is anchored at 16 to the cap 11 and at 17 to the axle 12. It is thus obvious that when the shade roller is used in its ordinary way to unroll the awning, the springs 15 will be subjected to considerable tension which will wind up the awning on the roller 10 as soon as the awning is released. It will also be obvious that either axle 12 may be pushed inwardly into the shade roller 10 against the compression of the spring 14 and that the axle 12 will resume its normal position when the pressure is released.

The arms 18 are vertical and parallel to each other and they are adapted to be seated against the inner edge surfaces of the stiles of the window frame or casing, they being held tightly against the stiles by the pressure of the spring 14 acting through the axles 12 and by other means set forth in the following description. The arms 18 are formed from strips of sheet steel which is folded upon itself as shown in Figure 5, the opposite edge being turned to form a portion $18^a$ for entering the window groove between the felt strip and the stile as shown in Figure 6. In general, the portion $18^a$ will be inclined at a right angle to the body of the arm 18 but in cars in which the outer wall of the window groove is inclined at an angle other than a right angle the portion $18^a$ will be modified accordingly. In the case of most automobiles the angle between the portion $18^a$ and the main portion will have a slightly rounded vertex but in some cars, notably the present closed models of Ford cars, an additional curve adjacent the vertex must be provided as shown in Figures 5 and 6. For preventing injury to the paint on the stile I have provided a layer $18^b$ of protective cushioning material such as soft rubber or the like, which layer may be either secured to the arm 18 or be placed in position when the awning frame is positioned in the window opening. It should be noted in this connection that the installation of my awning frame does not necessitate the use of nails or screws or any of the usual fastening devices which mar the finish of the car and which leave scars when the device is removed from the car.

The arm 18 is provided at its lower end with an arcuate rack 19 as best shown in Figure 2. This rack is preferably made from sheet metal and it is secured, preferably by welding, to the arm 18. Projecting inwardly from and secured to the arm 18 is a short arm 20 which is screw threaded at its free end portion. The bail 21 is provided with eyes at its extremities for engaging the arms 20, the arms of the bail being in contact with the notched portion of the rack 19. The resiliency of the bail is sufficient to ordinarily hold the arms in engagement with the rack, but in order to make this engagement more certain there may be provided a washer 22, a compression spring 23 and thumb nut 24 for each of the arms 20. The spring 23 acting against the washer 22 forces the arm of the bail into the notches of the rack 19, and the compression of the spring 23 may be regulated by means of the thumb nut 24. The resiliency of the bail is, however, great enough to press the arms 18 outwardly against the window stiles to thus hold the awning frame rigidly in place.

The structure shown in the Figures 2 and 3 is, of course, designed as a support for the awning which is preferably made from canvas or other suitable material. The lower portion of the awning is stitched to provide it with a loop for receiving the horizontal portion of the bail 21. The upper edge portion of the awning may be secured to the roller 10 in any desired manner but for the present purpose I have provided a clip 25 as shown in Figure 4, which is spot welded as shown in Figures 2 and 3 to the roller 10, this being my preferred form of fastening device. The clip 25 is provided with pointed ends so that it is only necessary to thrust the fabric down over the points of the clip and to then spread the arms of the clip in the manner common with paper fasteners and the like.

The awning as above described is designed primarily for use in automobiles. In applying it to the window of an automobile it is only necessary to snap the device into place with the portions 18ª in the window grooves where it will be held as firmly and securely as though it were permanently attached. A slight pull on the end of the awning will unwind the awning and at the same time it will wind the springs which cause the awning to wind automatically on the roller. When the awning has been unwound a sufficient distance the arms of the bail will be seated in one of the notches of the arcuate segment to thus hold the awning in its desired position. To release the awning and to cause it to be wound up on the roller, it is only necessary to disengage the arms of the bail from the arcuate segment. The support and the awning in no way interfere with the opening and the closing of the window. Whenever desired, as at the end of the season or at any other time, the entire device may be removed from the window opening as easily as it was put in place. In use, the awning is positively held in any position so that it cannot flap in the wind.

While I have described my invention in its relation to the window openings of closed automobiles, it is obvious that it may be used to advantage in the window openings of other structures. For example, the device may be used in summer cottages and in similar places where it will possess the same advantages which it has in its use with automobiles. I, therefore, do not desire to be restricted to the specific use of the device as described.

It will, of course, be obvious to those skilled in the art that the particular embodiment of my invention herein shown and described may be variously changed and modified without departing from the spirit of my invention or sacrificing the advantages thereof. It will, therefore, be understood that the disclosure herein is illustrative only and that my invention is not limited thereto.

Having thus described my invention in such full, clear, and exact terms that its construction and utility will be readily understood by others skilled in the art to which it pertains, what I claim as new and desire to secure by Letters Patent of the United States is:

1. In an expansible automobile awning frame of the type adapted to be mounted between the jambs of a window frame and having a pair of side plates connected at their upper ends to the expansible portions of the frame, the plates having out-turned lips adapted to enter the narrow slits in the window jambs, a resilient bail having its free ends pivotally mounted upon the lower ends of said plates for urging the lower ends of the plates outwardly against the window jambs, arcuate racks mounted on the lower ends of said plates concentric to the pivotal connections of the bail and plates, the teeth of said racks being inclined outwardly and downwardly to engage the arms of the bail and positively hold the latter against upward swinging movement, inwardly projecting arms carried upon the lower ends of said plates about which said bail is adapted to swing, springs on said inwardly extending arms, adjusting means mounted on the arms and engaging the spring, and friction washers mounted on the arms between the springs and the ends of the bail, said springs adapted to urge the ends of the bail outwardly and hold the bail in locked position on said racks.

2. In an expansible automobile awning frame of the type adapted to be mounted between the jambs of a window frame and having window jamb engaging plates connected at their upper ends to the expansible portions of the awning frame, the plates having out-turned lips adapted to enter the narrow slits in the window jambs, an arm extending inwardly from the lower end of each plate, a resilient bail pivotally connected at its free ends on said arms, arcuate racks carried by the plates concentric to the arms and having downwardly directed teeth for interlocking engagement with the arms of the bail to hold the bail in adjusted position, a spring on each of said arms, and adjusting means carried by the arms for binding the springs against the ends of the bail to yieldingly urge the arms of the bail into engagement with said racks.

In testimony whereof I affix my signature.

EARL E. McGREW.